US011863230B2

(12) United States Patent
Ito et al.

(10) Patent No.: US 11,863,230 B2
(45) Date of Patent: Jan. 2, 2024

(54) COMMUNICATION APPARATUS AND ERROR DETECTION METHOD

(71) Applicant: NIPPON TELEGRAPH AND TELEPHONE CORPORATION, Tokyo (JP)

(72) Inventors: Kenta Ito, Musashino (JP); Toshinori Hanano, Musashino (JP); Shun Morishima, Musashino (JP); Masayoshi Sekiguchi, Musashino (JP); Takayoshi Tashiro, Musashino (JP); Satoshi Shimazu, Musashino (JP); Haruka Nagoshi, Musashino (JP); Manabu Kubota, Musashino (JP); Tomoaki Yoshida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/798,300

(22) PCT Filed: Feb. 13, 2020

(86) PCT No.: PCT/JP2020/005494
§ 371 (c)(1),
(2) Date: Aug. 8, 2022

(87) PCT Pub. No.: WO2021/161441
PCT Pub. Date: Aug. 19, 2021

(65) Prior Publication Data
US 2023/0070907 A1    Mar. 9, 2023

(51) Int. Cl.
*H04B 10/077* (2013.01)
*H04B 10/079* (2013.01)

(52) U.S. Cl.
CPC ..... *H04B 10/0773* (2013.01); *H04B 10/0799* (2013.01)

(58) Field of Classification Search
CPC .................. H04B 10/0773; H04B 10/0799
See application file for complete search history.

(56) References Cited

U.S. PATENT DOCUMENTS

| 6,934,884 B1 | 8/2005 | Wakabayashi et al. | |
| 7,317,681 B1* | 1/2008 | Ben-Dvora | H04L 12/437 370/223 |
| 9,800,327 B2* | 10/2017 | Gerszberg | H04L 1/0002 |
| 2005/0188247 A1* | 8/2005 | Abe | G06F 3/0683 714/E11.093 |
| 2005/0283641 A1* | 12/2005 | Clark | G06F 11/2028 714/4.11 |

(Continued)

FOREIGN PATENT DOCUMENTS

| JP | 2004303271 A | 10/2004 |
| JP | 2005222379 A | 8/2005 |

(Continued)

*Primary Examiner* — Mina M Shalaby
(74) *Attorney, Agent, or Firm* — Harness, Dickey & Pierce, P.L.C.

(57) ABSTRACT

A communication apparatus includes a plurality of devices, each of the plurality of devices includes a monitoring unit configured to monitor at least one other device to detect an error that has occurred in the other device, and each of the plurality of devices is monitored by at least one other device.

8 Claims, 10 Drawing Sheets

(56) References Cited

U.S. PATENT DOCUMENTS

| | | | |
|---|---|---|---|
| 2006/0029389 A1* | 2/2006 | Cleary | H04Q 11/0067 398/33 |
| 2007/0140689 A1* | 6/2007 | Haran | H04B 10/077 398/27 |
| 2007/0165517 A1* | 7/2007 | Binetti | H04J 14/0291 370/222 |
| 2007/0230083 A1* | 10/2007 | Takakuwa | H04J 3/14 361/119 |
| 2008/0056159 A1* | 3/2008 | Suzuki | H04L 45/00 370/254 |
| 2008/0205294 A1* | 8/2008 | Brune | H04J 3/0679 370/254 |
| 2008/0240723 A1* | 10/2008 | Kershteyn | H04B 10/25137 714/699 |
| 2009/0285576 A1* | 11/2009 | Noel | H04L 65/1043 398/17 |
| 2013/0101283 A1* | 4/2013 | Zheng | H04B 10/032 398/2 |
| 2013/0294769 A1* | 11/2013 | Kotrla | H04B 10/0775 398/33 |
| 2014/0199061 A1* | 7/2014 | Shinohara | H04J 14/0257 398/5 |
| 2014/0233940 A1* | 8/2014 | Pitzer | H04B 10/272 398/8 |
| 2016/0149752 A1* | 5/2016 | Belanger | H04L 41/0659 370/216 |
| 2017/0201814 A1* | 7/2017 | Chen | H04L 63/10 |
| 2020/0028784 A1* | 1/2020 | Tochio | H04L 47/826 |
| 2020/0228458 A1* | 7/2020 | Huang | H04J 3/1658 |
| 2020/0328806 A1* | 10/2020 | Shimizu | H04B 10/0791 |

FOREIGN PATENT DOCUMENTS

| | | |
|---|---|---|
| JP | 200861091 A | 3/2008 |
| JP | 2017158088 A | 9/2017 |

* cited by examiner

COMMUNICATION APPARATUS AND ERROR DETECTION METHOD

CROSS-REFERENCE TO RELATED APPLICATIONS

This application is a 371 U.S. National Phase of International Application No. PCT/JP2020/005494, filed on Feb. 13, 2020. The entire disclosure of the above application is incorporated herein by reference.

TECHNICAL FIELD

The present invention relates to a communication apparatus and an error detection method.

BACKGROUND ART

Figure 10:
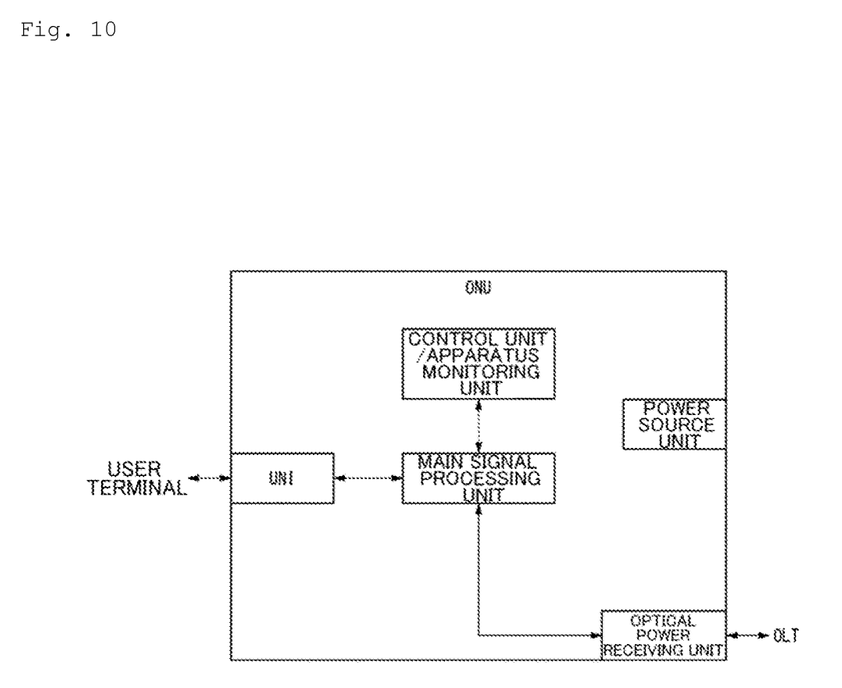
FIG. 10 is a schematic diagram showing an example of a configuration of a conventional communication apparatus.

Conventionally, there has been an apparatus that can detect a failure of the apparatus and an error that occurs in data flowing inside the apparatus (hereinafter collectively referred to as "errors") (e.g., see PTL 1). An example of such an apparatus is shown in FIG. 10. FIG. 10 is an overall configuration diagram showing an example of a conventional communication apparatus. As illustrated, in FIG. 10, the communication apparatus is an ONU (Optical Network Unit). The ONU includes a main signal processing unit and a control unit/apparatus monitoring unit. The main signal processing unit performs processing such as mutual conversion between an optical signal and an electric signal on a main signal flowing between an OLT (Optical Line Terminal) and a user terminal. The control unit/apparatus monitoring unit detects an error by checking the consistency of the data flowing inside the communication apparatus. For example, the control unit/apparatus monitoring unit detects an error by monitoring the main signal flowing through the main signal processing unit. Then, the control unit/apparatus monitoring unit corrects the detected error.

CITATION LIST

Patent Literature

[PTL 1] Japanese Patent Application Publication No. 2004-303271

SUMMARY OF THE INVENTION

Technical Problem

As stated above, a conventional communication apparatus can detect an error due to including a control unit/apparatus monitoring unit. However, there is a problem in that if an error that causes runaway or stopping of operation of a device for monitoring the communication apparatus (i.e., a device including the control unit/apparatus monitoring unit) occurs, the conventional communication apparatus cannot detect the error.

The present invention was made in view of the foregoing respects, and an object thereof is to provide a technique according to which it is possible to detect an error even if the error occurs in a device for monitoring a communication apparatus in which the device is included.

Means for Solving the Problem

An aspect of the present invention is a communication apparatus including a plurality of devices, in which each of the plurality of devices includes a monitoring unit configured to monitor at least one other device to detect an error that has occurred in the other device, and each of the plurality of devices is monitored by at least one other device.

Also, an aspect of the present invention is an error detection method to be performed by a communication apparatus including a plurality of devices, each of the devices being monitored by at least one other device, the method including a step of monitoring at least one other device to detect an error that has occurred in the other device.

Effects of the Invention

According to the present invention, it is possible to detect an error even if the error occurs in a device for monitoring a communication apparatus in which the device is included.

DESCRIPTION OF EMBODIMENTS

First Embodiment

Hereinafter, a first embodiment of the present invention will be described with reference to the drawings.

[Overall Configuration of Communication System]

Figure 1:
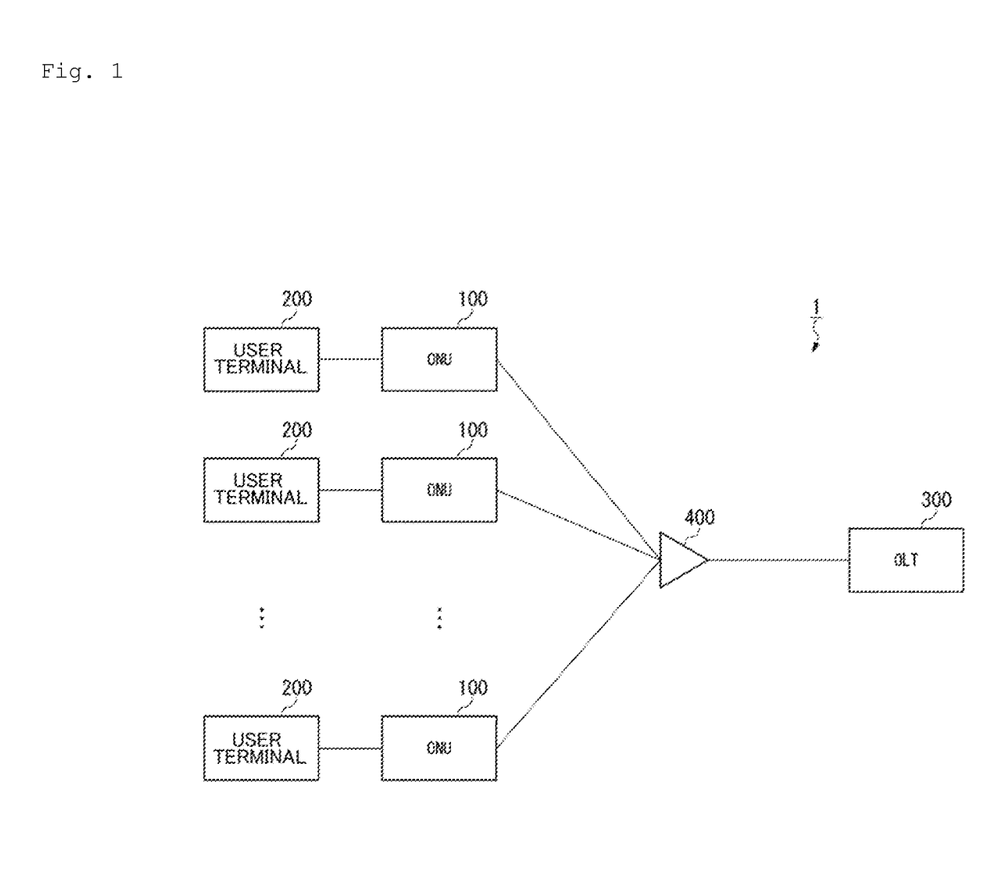
FIG. 1 is an overall configuration diagram of a communication system 1 according to a first embodiment of the present invention.

FIG. 1 is an overall configuration diagram of a communication system 1 according to the first embodiment of the present invention. The communication system 1 shown in FIG. 1 is a 10G-EPON (10 Gigabit-Ethernet Passive Optical Network) system. As shown in the drawing, the communication system 1 is constituted by including a plurality of ONUs 100, a plurality of user terminals 200 respectively communicably connected to the ONUs 100, an OLT 300, and an optical splitter 400. The communication system 1 is a system in which one OLT 300 and a plurality of ONUs 100 are communicably connected in a Point-to-Multipoint manner via the optical splitter 400. However, the communication system 1 may also be a system in which one each of the OLTs 300 and the ONUs 100 are connected to each other in a Point-to-Point manner. The user terminal 200 is, for example, an information processing apparatus such as a personal computer or a home gateway.

[Configuration of ONU]

Figure 2:
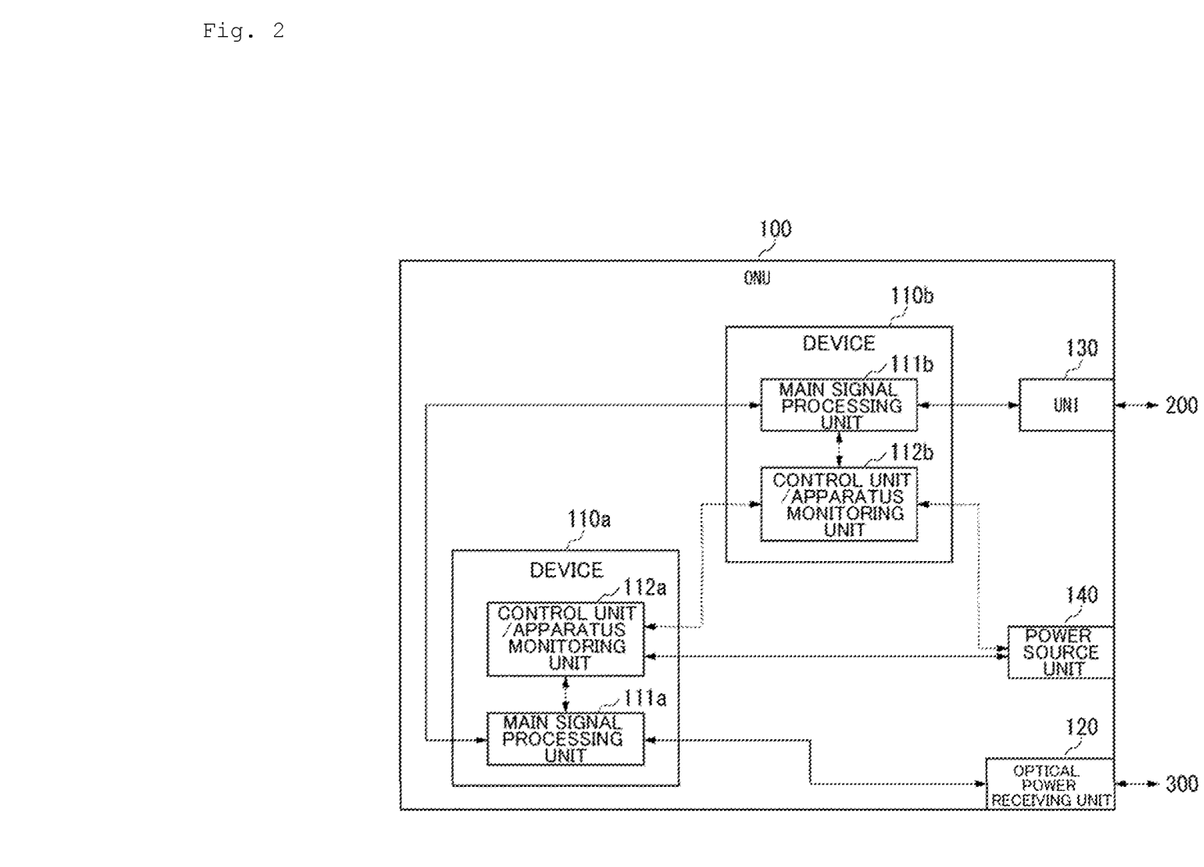
FIG. 2 is a schematic block diagram showing a functional configuration of an ONU 100 according to the first embodiment of the present invention.

FIG. 2 is a schematic block diagram showing a functional configuration of the ONU 100 according to the first embodiment of the present invention. As shown in FIG. 2, the ONU 100 includes a device 110a, a device 110b, an optical power receiving unit 120, a UNI (User Network Interface) 130, and a power source unit 140. Note that in FIG. 2, the solid-line arrows indicate a communication line through which the main signal flows. Also, the broken-line arrows indicate a control signal line through which the control signal flows.

The device 110a is constituted by including a main signal processing unit 111a and a control unit/apparatus monitoring unit 112a. Also, the device 110b is constituted by including a main signal processing unit 111b and a control unit/apparatus monitoring unit 112b. In this manner, the device 110a and the device 110b have the same configuration. Note that if it is not necessary to particularly distinguish between the device 110a and the device 110b, the term "device 110" will simply be used below. Also, if it is not necessary to particularly distinguish between the main signal processing unit 111a and the main signal processing unit 111b, the term "main signal processing unit 111" will simply be used below. Also, if it is not necessary to particularly distinguish between the control unit/apparatus monitoring unit 112a and the control unit/apparatus monitoring unit 112b, the term "control unit/apparatus monitoring unit 112" will simply be used below.

The main signal processing unit 111 performs processing such as mutual conversion between an optical signal and an electric signal on the main signal flowing between the OLT (Optical Line Terminal) 300 and the user terminal 200.

The control unit/apparatus monitoring unit 112a is constituted by including a processor such as a CPU (Central Processing Unit), for example. The control unit/apparatus monitoring unit 112a controls the operation of each functional unit included in the ONU 100. Also, the control unit/apparatus monitoring unit 112a detects an error that occurs in the main signal by monitoring the main signal flowing through the main signal processing unit 111a. Also, the control unit/apparatus monitoring unit 112a executes alive monitoring of the other device 110 (i.e., the device 110b) via the control signal line. Also, if the control unit/apparatus monitoring unit 112a detects runaway or stopping of operation of the other device 110, the control unit/apparatus monitoring unit 112a outputs a reset instruction to the other device 110 via the control signal line. Alternatively, if the control unit/apparatus monitoring unit 112a detects runaway or stopping of operation of the other device 110, the control unit/apparatus monitoring unit 112a outputs a power source reset instruction to the power source unit 140 via the control signal line. Also, if the control unit/apparatus monitoring unit 112a acquires a reset instruction from the control unit/apparatus monitoring unit 112 (i.e., the control unit/apparatus monitoring unit 112b) of the other device 110 via the control signal line, the control unit/apparatus monitoring unit 112a performs reset processing for resetting the operating state of device 110a.

The control unit/apparatus monitoring unit 112b is constituted by including, for example, a processor such as a CPU. The control unit/apparatus monitoring unit 112b controls the operation of each functional unit included in the ONU 100. Also, the control unit/apparatus monitoring unit 112b detects an error that occurs in the main signal by monitoring the main signal flowing through the main signal processing unit 111b. Also, the control unit/apparatus monitoring unit 112b executes alive monitoring of the other device 110 (i.e., the device 110a) via the control signal line. Also, if the control unit/apparatus monitoring unit 112b detects runaway or stopping of operation of the other device 110, the control unit/apparatus monitoring unit 112b outputs a reset instruction to the other device 110 via the control signal line. Alternatively, if the control unit/apparatus monitoring unit 112b detects runaway or stopping of operation of the other device 110, the control unit/apparatus monitoring unit 112b outputs a power source reset instruction to the power source unit 140 via the control signal line. Also, if the control unit/apparatus monitoring unit 112b obtains a reset instruction from the control unit/apparatus monitoring unit 112 (i.e., the control unit/apparatus monitoring unit 112a) of the other device 110 via the control signal line, the control unit/apparatus monitoring unit 112b performs reset processing for resetting the operating state of device 110b.

The optical power receiving unit 120 receives the optical signal transmitted from the OLT 300 and outputs it to the main signal processing unit 111. Also, the optical power receiving unit 120 transmits the optical signal output from the main signal processing unit 111 to the OLT 300.

The UNI 130 transmits the electric signal output from the main signal processing unit 111 to the user terminal 200. Also, the UNI 130 outputs an electric signal transmitted from the user terminal 200 to the main signal processing unit 11.

The power source unit 140 supplies power to each functional unit included in the ONU 100. Also, if the power source unit 140 acquires a reset instruction from the control unit/apparatus monitoring unit 112 via the control signal line, after temporarily stopping the supply of power to the entire ONU 100 (i.e., after the power is turned off), the power source unit 140 executes power source reset processing for resuming the supply of power to the entire ONU 100 (i.e., turns on the power source).

Note that any method can be used for resetting the device 110 and resetting the power source of the entire ONU 100.

[Operations of Device]

Figure 3:
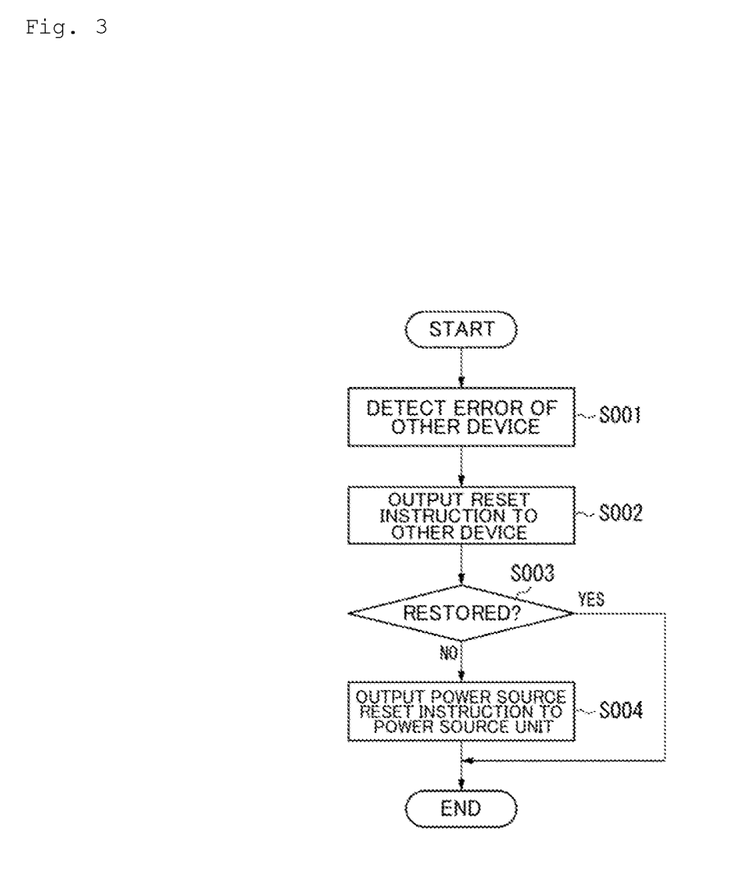
FIG. 3 is a flowchart showing operations of a device 110 according to the first embodiment of the present invention.

FIG. 3 is a flowchart showing operations of the device 110 according to the first embodiment of the present invention. The flowchart shown in FIG. 3 starts when an error occurs in the other device 110. Note that in the following description, the operations of the device 110a will be described as an example, but the operations of the device 110b are also the same.

The control unit/apparatus monitoring unit 112a of the device 110a detects an error that has occurred in the other device 110 (device 110b) (step S001). As described above, the error referred to here is, for example, runaway or stopping of operation of the device 110. Next, the control unit/apparatus monitoring unit 112a outputs a reset instruction to the other device 110 (device 110b) via the control signal line (step S002).

Next, if the control unit/apparatus monitoring unit 112a detects that the other device 110 (device 110b) has been restored due to reset processing (step S003, Yes), the operations of the device 110a shown in the flowchart of FIG. 3 end. On the other hand, if the control unit/apparatus monitoring unit 112a detects that the other device 110 (device 110b) has not been restored (step S003, No), the control unit/apparatus monitoring unit 112a outputs a power source reset instruction to the power source unit 140 via the control signal line (step S004). This completes the operations of the device 110a shown in the flowchart of FIG. 3.

As described above, in the ONU 100 (communication apparatus) according to the first embodiment, a plurality of devices 110 (communication processing units) in the communication apparatus mutually perform monitoring. Then, if an error occurs in one device 110 and the one device 110 undergoes runaway, stops operating, or the like, the ONU 100 resets the operating state of the one device 110 using the other device 110. Alternatively, if the device 110 undergoes runaway, stops operating, or the like, the ONU 100 resets the power source of the entire communication apparatus (ONU) 100.

Note that in the conventional communication apparatus, if a soft error such as bit inversion occurs, for example, it is assumed that the device inside the communication apparatus detects and corrects the error. However, in the conventional communication apparatus, if, for example, a soft error that causes runaway, stopping of operation, or the like of a device for monitoring the communication apparatus occurs in that device, the soft error cannot be detected.

In contrast to this, the ONU 100 according to the first embodiment has the above configuration, and thereby even if an error occurs in the device 110 for monitoring the communication apparatus, the ONU 100 can detect the error and restore itself.

Note that in the first embodiment, a configuration is used in which if the control unit/apparatus monitoring unit 112 of one device 110 detects an error that occurs in the other device 110, the control unit/apparatus monitoring unit 112 first instructs a reset of the other device 110, and if the other device 110 is not restored, the control unit/apparatus monitoring unit 112 instructs a power source reset of the entire communication apparatus (ONU 100). However, there is no limitation to this kind of configuration, and it is also possible to use a configuration in which if the control unit/apparatus monitoring unit 112 of one device 110 detects an error that occurs in another device 110, the control unit/apparatus monitoring unit 112 first instructs a reset of the other device 110, and if the other device 110 is not restored even if a plurality of instances of the reset are attempted, the control unit/apparatus monitoring unit 112 instructs a power source reset of the entire communication apparatus (ONU 100).

It is also possible to use a configuration in which the control unit/apparatus monitoring unit 112 performs only the former processing or only the latter processing. That is, for example, if the control unit/apparatus monitoring unit 112 of one device 110 detects an error that has occurred in the other device 110, the control unit/apparatus monitoring unit 112 may also perform only instruction of a reset of the other device 110. Alternatively, for example, if the control unit/apparatus monitoring unit 112 of one device 110 detects an error that has occurred in the other device 110, the control unit/apparatus monitoring unit 112 may also instruct a power source reset of the entire communication apparatus (ONU 100) without attempting a reset of the other device 110.

Note that in the first embodiment, the ONU 100 is configured to include two devices 110 (device 110a and device 110b), but may also be configured to include N (N being an integer that is 3 or more) devices 110. In this case, for example, if the probability of an error occurring in each device 110 is 1/X, the probability of an error occurring simultaneously in N devices is $(1/X)^N$. For this reason, the likelihood that the ONU 100 cannot be restored due to an error occurring at the same time in all the devices 110 becomes exponentially lower the greater the number of devices 110 included in the ONU 100 is.

In this manner, according to the first embodiment, the robustness of the device can be improved without complicating the device configuration.

Note that the configuration of the ONU 100 according to the first embodiment described above is merely an example. For example, it is also possible to use a configuration such as a modified example of the first embodiment described below. The communication apparatus according to the modified example described below includes a plurality of devices capable of mutually performing alive monitoring, similarly to the ONU 100 according to the first embodiment described above.

Modified Example

[Operations of Device]

Hereinafter, an example of operations of a communication apparatus according to a modified example of the first embodiment will be described.

Figure 4:
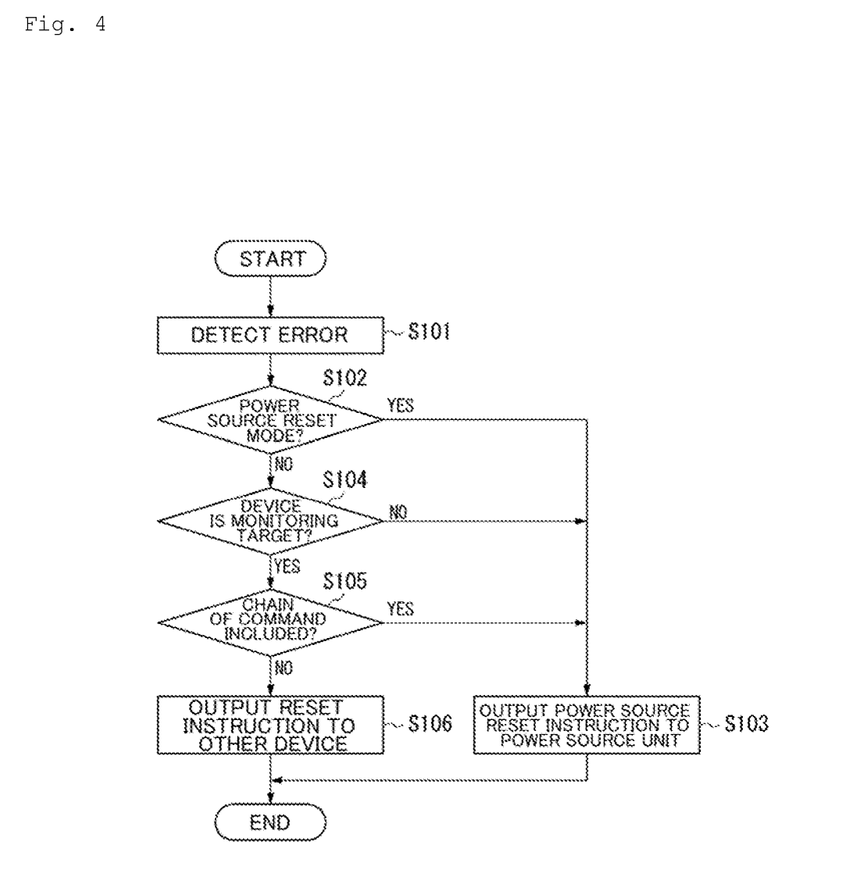
FIG. 4 is a flowchart showing operations of a device included in a communication apparatus according to a modified example of the first embodiment of the present invention.

FIG. 4 is a flowchart showing operations of a device included in the communication apparatus according to the modified example of the first embodiment of the present invention. This flowchart starts when some kind of error occurs in the communication apparatus. Note that in the following description, the operations of any one device among the plurality of devices included in the communication apparatus will be described. Note that in the following description, the one device is referred to as "one device", and one of the other devices is referred to as "another device".

Note that each device can be executed in two operation modes, namely a "power source reset mode" and a "device reset mode". The power source reset mode is an operation mode for instructing a reset of the power source of the entire communication apparatus when it is detected that an error has occurred in the communication apparatus. On the other hand, the device reset mode is an operation mode in which when it is detected that an error has occurred in the communication apparatus, if the location where the error occurs is the other device, which is a monitoring target, a reset of the other device is instructed in some cases.

Note that the other device, which is a monitoring target, is a device that can instruct a reset of the other device if the one device detects an error that occurs in the other device.

Note that the operation mode is set in advance for each device by, for example, an operation manager or the like.

As shown in FIG. 4, first, the one device detects an error that has occurred in the communication apparatus in which the one device is included (step S101). If the one device is operating in the power source reset mode (step S102, Yes), the one device outputs a power source reset instruction to the power source unit via a control signal (step S103). This completes the operation of the device shown in the flowchart of FIG. 4.

If the one device is operating in the device reset mode (step S102, No), the one device determines whether or not the error detected in step S101 is an error that has occurred in the device that is the monitoring target. If the detected error is not an error that has occurred in the device that is the monitoring target (step S104, No), the one device outputs a power source reset instruction to the power source unit via the control signal (step S103). This completes the operations of the device shown in the flowchart of FIG. 4.

When the detected error is an error that has occurred in the device that is the monitoring target (step S104, Yes), if the one device has a chain of command (step S105, Yes), the one device outputs a power source reset instruction to the power source unit via the control signal line (step S103). This completes the operations of the device shown in the flowchart of FIG. 4.

If the one device does not have a chain of command (step S105, No), the one device outputs a reset instruction to the other device in which the error has occurred via the control signal line (step S106). This completes the operations of the device shown in the flowchart of FIG. 4.

In this manner, the communication apparatus according to the modified example of the first embodiment has a configuration in which the operation differs depending on what the operation mode is, whether the device is the monitoring target, and whether the device has a chain of command. Hereinafter, three configuration examples of the functional configuration of the communication apparatus according to the modified example of the first embodiment will be described.

First Configuration Example

Hereinafter, a functional configuration of a communication apparatus 600$p$ according to a first configuration example will be described.

Figure 5:
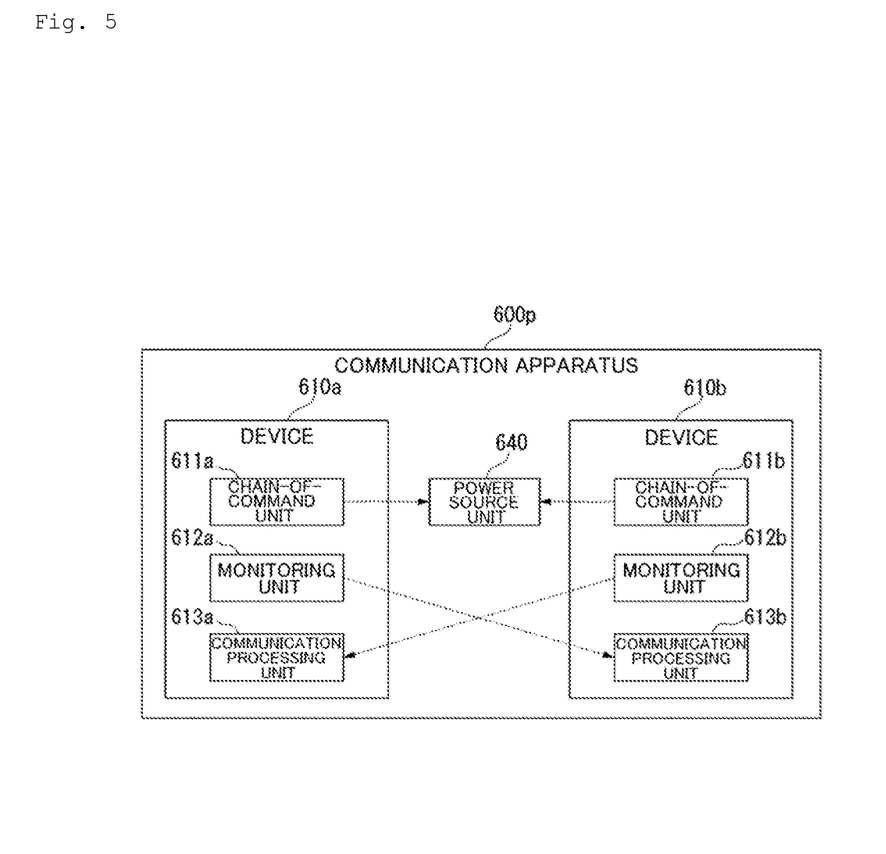
FIG. 5 is a schematic block diagram showing a configuration of a communication apparatus 600p according to a modified example of the first embodiment of the present invention.

FIG. 5 is a schematic block diagram showing a configuration of the communication apparatus 600$p$ according to the modified example of the first embodiment of the present invention. As shown in FIG. 5, the communication apparatus 600$p$ includes a device 610$a$, a device 610$b$, and a power source unit 640. Note that in FIG. 5, the broken-line arrows represent the control signal line through which the control signal flows.

The device 610$a$ is constituted by including a chain-of-command unit 611$a$, a monitoring unit 612$a$, and a communication processing unit 613$a$. Also, the device 610$b$ is constituted by including a chain-of-command unit 611$b$, a monitoring unit 612$b$, and a communication processing unit 613$b$.

In this manner, in the communication apparatus 600$p$ according to the first configuration example, both the device 610$a$ and the device 610$b$ are configured to include a chain-of-command unit. The chain-of-command unit is constituted by a processor such as a CPU, for example.

The chain-of-command unit 611$a$ and the chain-of-command unit 611$b$ can cause the power source unit 640 to perform power source resetting of the entire communication apparatus 600$p$ by outputting a power source reset instruction to the power source unit 640.

The monitoring unit 612$a$ of the device 610$a$ can detect that an error has occurred in the communication processing unit 613$b$ of the device 610$b$. If the monitoring unit 612$a$ detects that an error has occurred in the communication processing unit 613$b$, the chain-of-command unit 611$a$ of the device 610$a$ outputs a power source reset instruction to the power source unit 640.

The monitoring unit 612$b$ of the device 610$b$ can detect that an error has occurred in the communication processing unit 613$a$ of the device 610$a$. If the monitoring unit 612$b$ detects that an error has occurred in the communication processing unit 613$a$, the chain-of-command unit 611$b$ of the device 610$b$ outputs a power source reset instruction to the power source unit 640.

In this manner, the communication apparatus 600$p$ according to the first configuration example is configured to cause the power source unit 640 to perform a power source reset if one device detects that an error has occurred in the communication processing unit of another device.

Second Configuration Example

Hereinafter, a functional configuration of a communication apparatus 600$q$ according to a second configuration example will be described.

Figure 6:
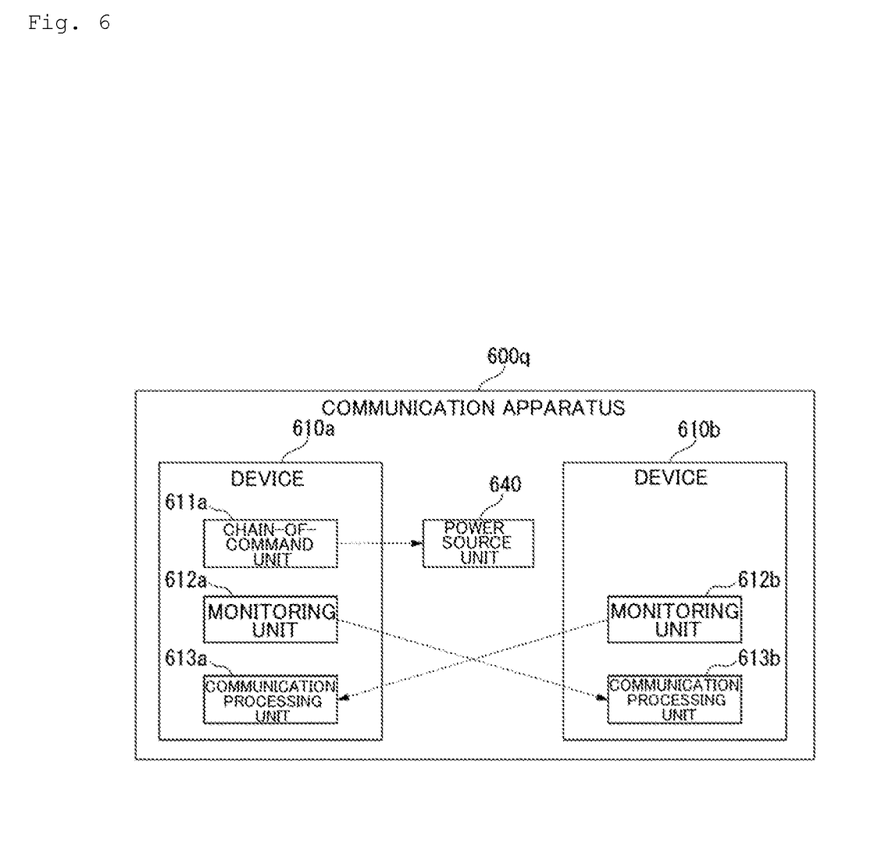
FIG. 6 is a schematic block diagram showing a configuration of a communication apparatus 600q according to a modified example of the first embodiment of the present invention.

FIG. 6 is a schematic block diagram showing a configuration of the communication apparatus 600$q$ according to the modified example of the first embodiment of the present invention. As shown in FIG. 6, the communication apparatus 600$q$ includes a device 610$a$, a device 610$b$, and a power source unit 640. Note that in FIG. 6, the broken line arrows represent the control signal line through which the control signal flows.

The device 610$a$ is constituted by including a chain-of-command unit 611$a$, a monitoring unit 612$a$, and a communication processing unit 613$a$. Also, the device 610$b$ is constituted by including a monitoring unit 612$b$ and a communication processing unit 613$b$.

In this manner, in the communication apparatus 600$p$ according to the second configuration example, the device 610$a$ has a chain-of-command unit, but the device 610$b$ does not have a chain-of-command unit.

The chain-of-command unit 611$a$ of the device 610$a$ can cause the power source unit 640 to perform a power source reset of the entire communication apparatus 600$q$ by outputting a power source reset instruction to the power source unit 640.

The monitoring unit 612$b$ of the device 610$b$ can cause the device 610$a$ to perform resetting of the device 610$a$ by outputting a reset instruction to the device 610$a$.

The monitoring unit 612$a$ of the device 610$a$ can detect that an error has occurred in the communication processing unit 613$b$ of the device 610$b$. If the monitoring unit 612$a$ detects that an error has occurred in the communication processing unit 613$b$, the chain-of-command unit 611$a$ of the device 610$a$ outputs a power source reset instruction to the power source unit 640.

The monitoring unit 612$b$ of the device 610$b$ can detect that an error has occurred in the communication processing unit 613$a$ of the device 610$a$. If the monitoring unit 612$b$ detects that an error has occurred in the communication processing unit 613$a$, the monitoring unit 612$b$ outputs a reset instruction to the device 610$a$.

In this manner, the communication apparatus 600$p$ according to the second configuration example is configured such that when one device detects that an error has occurred in the communication processing unit of another device, if the one device has a chain-of-command unit, the one device causes the power source unit 640 to perform a power source reset, and if the one device does not have a chain-of-command unit, the other device is reset.

Third Configuration Example

Hereinafter, a functional configuration of a communication apparatus 600$r$ according to a third configuration example will be described.

Figure 7:
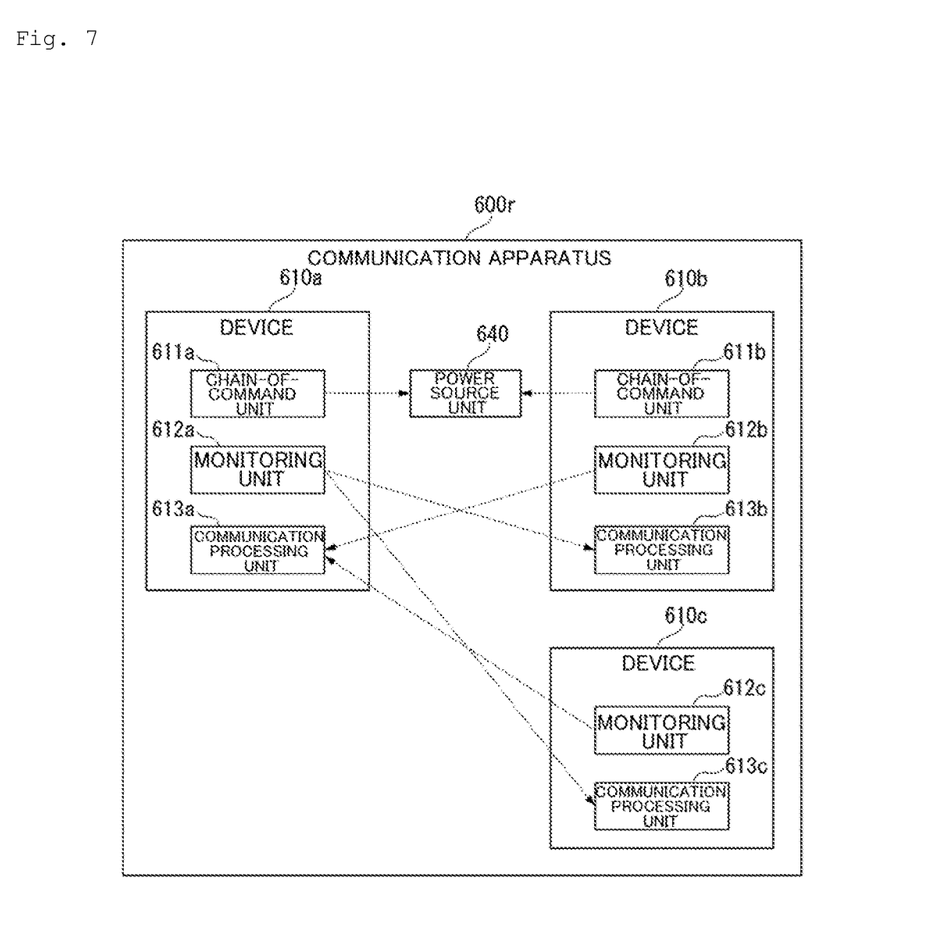
FIG. 7 is a schematic block diagram showing a configuration of a communication apparatus 600r according to a modified example of the first embodiment of the present invention.

FIG. 7 is a schematic block diagram showing a configuration of the communication apparatus 600$r$ according to a modified example of the first embodiment of the present invention. As shown in FIG. 7, the communication apparatus 600$r$ includes a device 610$a$, a device 610$b$, a device 610$c$, and a power source unit 640. Note that in FIG. 7, the broken line arrow represents the control signal line through which the control signal flows.

The device 610a is constituted by including a chain-of-command unit 611a, a monitoring unit 612a, and a communication processing unit 613a. Also, the device 610b is constituted by including a chain-of-command unit 611b, a monitoring unit 612b, and a communication processing unit 613b. Also, the device 610c is constituted by including a monitoring unit 612c and a communication processing unit 613c.

In this manner, in the communication apparatus 600r according to the third configuration example, the device 610a and the device 610b include a chain-of-command unit, but the device 610c does not include a chain-of-command unit.

The chain-of-command unit 611a of the device 610a and the chain-of-command unit 611b of the device 610b can cause the power source unit 640 to perform a power source reset of the entire communication apparatus 600p by outputting a power source reset instruction to the power source unit 640.

The monitoring unit 612c of the device 610c can cause the device 610a to perform a reset of the device 610a by outputting a reset instruction to the device 610a.

The monitoring unit 612a of the device 610a can detect that an error has occurred in the communication processing unit 613b of the device 610b and the communication processing unit 613c of the device 610c. If the monitoring unit 612a detects that an error has occurred in the communication processing unit 613b or the communication processing unit 613b, the chain-of-command unit 611a of the device 610a outputs a power source reset instruction to the power source unit 640.

The monitoring unit 612b of the device 610b can detect that an error has occurred in the communication processing unit 613a of the device 610a. If the monitoring unit 612b detects that an error has occurred in the communication processing unit 613a, the chain-of-command unit 611b of the device 610b outputs a power source reset instruction to the power source unit 640.

The monitoring unit 612c of the device 610c can detect that an error has occurred in the communication processing unit 613a of the device 610a. If the monitoring unit 612b detects that an error has occurred in the communication processing unit 613a, the monitoring unit 612b outputs a reset instruction to the device 610a.

In this manner, the communication apparatus 600r according to the third configuration example is configured such that when one device detects that an error has occurred in the communication processing unit of another device, if the one device has a chain-of-command unit, the one device causes the power source unit 640 to perform a power source reset, and if the one device does not have a chain-of-command unit, the other device is reset.

Second Embodiment

Hereinafter, a second embodiment of the present invention will be described with reference to the drawings. Note that the overall configuration diagram of the communication system 1 and the schematic block diagram showing the functional configuration of the ONU 100 in the second embodiment described below are the same as those in the first embodiment (i.e., the same as FIGS. 1 and 2, respectively), and therefore description thereof will be omitted.

[Operations of Device]

Figure 8:
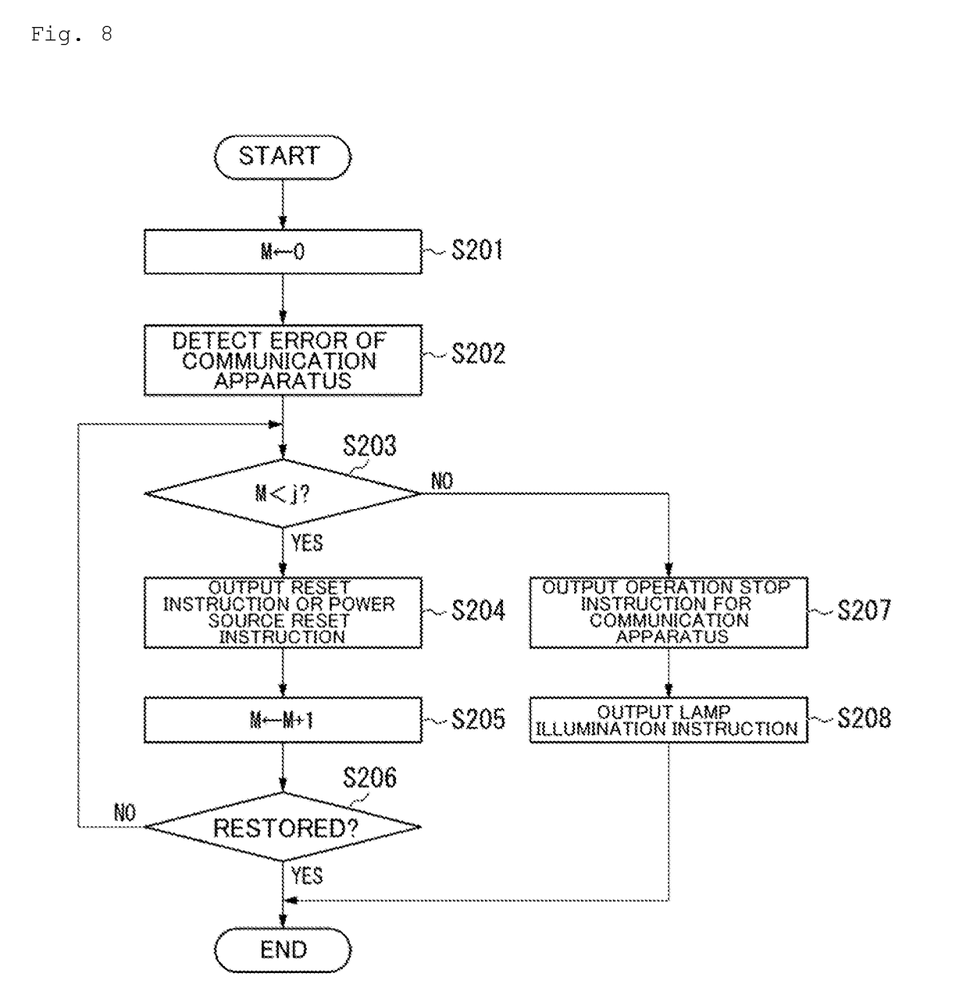
FIG. 8 is a flowchart showing operations of a device 110 according to a second embodiment of the present invention.

FIG. 8 is a flowchart showing operations of the device 110 according to the second embodiment of the present invention. The flowchart shown in FIG. 8 starts when an error occurs in the ONU 100. Note that the error referred to here may also include not only an error that occurs in another device 110, but also an error that occurs in the device 110 and an error that occurs in another member (a member other than the device 110) in the ONU 100.

The control unit/apparatus monitoring unit 112 initializes a variable M, which indicates a counter for counting the number of instances of outputting the power source reset instruction, by substituting 0 for the value of the variable M (step S201). Note that the leftward arrows shown in steps S201 and S205 of the flowchart of FIG. 8 mean operations of substituting the value on the right side for the variable on the left side. The value of the variable M is temporarily stored in, for example, a storage medium (not shown) included in the control unit/apparatus monitoring unit 112. The storage medium referred to here is, for example, a cache memory mounted in a CPU or the like.

Next, the control unit/apparatus monitoring unit 112 of the device 110 detects an error that has occurred in the communication apparatus (ONU 100) in which the control unit/apparatus monitoring unit 112 is included (step S202). As described above, the error referred to here is an error that causes, for example, runaway or stopping of operation of the device 110.

The control unit/apparatus monitoring unit 112 determines whether or not the value of the variable M is less than a predetermined value j (step S203). Note that the predetermined value j is a value indicating the maximum number of instances of attempting power source reset processing. The predetermined value j is, for example, a value determined in advance by a person in charge of operation and management, or the like.

If the value of the variable M is less than the predetermined value j (step S203, Yes), the control unit/apparatus monitoring unit 112 outputs a reset instruction to the other device 110 or a power source reset instruction to the power source unit 140 via the control signal line (step S204). Note that the operations for the control unit/apparatus monitoring unit 112 to output the reset instruction to the other device 110 or to give the power source reset instruction to the power source unit 140 are performed according to, for example, the above-described flowchart shown in FIG. 4. Next, the control unit/apparatus monitoring unit 112 adds 1 to the value of the variable M (step S205).

Next, if the control unit/apparatus monitoring unit 112 detects that the ONU 100 has been restored due to the reset processing in the other device 110 or the power source reset processing performed by the power source unit 140 (step S206, Yes), the operations of the device 110 indicated by the flowchart of FIG. 8 end. On the other hand, if the control unit/apparatus monitoring unit 112 detects that the ONU 100 has not been restored (step S206, No), the operations of step S203 and onward described above are repeated.

On the other hand, if the value of the variable M reaches the predetermined value j (step S203, No), the control unit/apparatus monitoring unit 112 outputs an operation stopping instruction for the communication apparatus (ONU 100) (step S207).

Note that any method can be used as a method for stopping the operation of the ONU 100. For example, the control unit/apparatus monitoring unit 112 may stop the operation of the ONU 100 by outputting an operation stopping instruction, which is an instruction to stop the power supply to the entire ONU 100, to the power source unit 140 via the control signal line.

Next, the control unit/apparatus monitoring unit 112 outputs an illumination instruction indicating an instruction to illuminate a lamp (not shown) provided in the ONU 100 (step S208). This completes the operations of the device 110 shown in the flowchart of FIG. 8.

Note that any method can be used as a method for illuminating the lamp. For example, the control unit/apparatus monitoring unit 112 starts power supply from the power source unit 140 to the lamp by outputting an illumination instruction to the power source unit 140 via the control signal line, and illuminates the lamp.

By turning on the lamp in this manner, the user, the person in charge of operation and maintenance, or the like can recognize that the ONU 100 is in the operation-stopped state (abnormal state). When the user, the person in charge of operation and maintenance, or the like recognizes that the ONU 100 is in the operation-stopped state, the user, the person in charge of operation and maintenance, or the like manually restores the operating state of the ONU 100. For example, the user, the person in charge of operation and maintenance, or the like restores the operating state of the ONU 100 by unplugging and plugging in a power plug (not shown) included in the ONU 100 into an outlet (not shown).

Note that a method other than the method of illuminating the lamp may also be used as long as it is a method according to which the user, the person in charge of operation and maintenance, or the like can be notified that the ONU 100 is in the operation-stopped state. For example, the control unit/apparatus monitoring unit 112 may use a speaker (not shown) provided in the ONU 100 to notify the user, the person in charge of operation and maintenance, or the like by audio. Alternatively, for example, the control unit/apparatus monitoring unit 112 may also display information indicating that the ONU 100 is in the operation-stopped state on a display device (not shown) such as a liquid crystal display (LCD) included in the communication apparatus (ONU 100) in which the control unit/apparatus monitoring unit 112 is included, or an external device.

As described above, the ONU 100 (communication apparatus) according to the second embodiment monitors itself. Then, if an error that causes, for example, runaway or stopping of operation occurs in itself, the ONU 100 executes a power source reset for resetting the supply of power to the entire communication apparatus. If the communication apparatus is still not restored, the ONU 100 repeatedly performs the power source reset. If the communication apparatus is still not restored even if the power source reset is attempted until the predetermined number of instances is reached, the ONU 100 stops the operation of itself. Then, the ONU 100 illuminates the lamp in order to cause the user, the person in charge of operation and maintenance, or the like to recognize that the communication apparatus is in the operation-stopped state. As a result, the ONU 100 can prompt manual restoration of itself. The ONU 100 waits until restoration of itself is performed manually by the user, the person in charge of operation and maintenance, or the like.

By including the above configuration, the ONU 100 according to the second embodiment can autonomously attempt restoration of itself if an error occurs in itself. If the ONU 100 detects an error from which restoration is possible through, for example, a power source reset (or reconfiguration), the ONU 100 can autonomously reset and restore itself. As a result, with the ONU 100 according to the second embodiment, the frequency of a manual restoration task is reduced, and therefore the operating cost of a communication apparatus that can handle errors that occur in the communication apparatus can be reduced.

Note that according to the second embodiment, for example, it is also expected that resistance to soft errors caused by neutron rays originating from cosmic rays will be improved.

Note that in the second embodiment, if the control unit/apparatus monitoring unit 112 of the device 110 detects an error that occurs in the ONU 100, first, the control unit/apparatus monitoring unit 112 instructs a power source reset of the entire ONU 100, and if the communication apparatus still is not restored, the power source reset is repeatedly instructed until the predetermined number of instances is reached. If restoration still does not occur even if the number of instances of attempting the power source reset reaches the predetermined number of instances, the control unit/apparatus monitoring unit 112 stops the operation of the ONU 100. Also, the control unit/apparatus monitoring unit 112 is configured to illuminate the lamp provided in the ONU 100. However, there is no limitation to such a configuration, and the control unit/apparatus monitoring unit 112 may also be configured to perform only the former processing or only the latter processing. That is, for example, the control unit/apparatus monitoring unit 112 may only stop the operation of the communication apparatus if the communication apparatus still is not restored even if the number of instances of attempting the power source reset reaches a predetermined number of instances (i.e., it is also possible to use a configuration in which notification through illumination of a lamp or the like is not performed). Alternatively, for example, if the communication apparatus is not restored even if the control unit/apparatus monitoring unit 112 instructs a power source reset of the entire ONU 100, the control unit/apparatus monitoring unit 112 may also illuminate the lamp without repeatedly instructing the power source reset.

Modified Example of Second Embodiment

Hereinafter, a modified example of the second embodiment of the present invention will be described with reference to the drawings. Note that the overall configuration diagram of the communication system 1 and the schematic block diagram showing the functional configuration of the ONU 100 in the modified example of the second embodiment described below are the same as those of the first embodiment (i.e., the same as FIGS. 1 and 2, respectively), and therefore description thereof will be omitted.

In the second embodiment described above, a configuration was used in which if the ONU 100 detects an error that occurs in itself, the ONU 100 first attempts a power source reset for resetting the power supply to the entire communication apparatus, and if the communication apparatus still is not restored, operation of the communication apparatus is stopped. In contrast to this, in the modified example of the second embodiment described below, if a device 110 of the ONU 100 detects an error that occurs in another device 110 included in the ONU 100, the device 110 of the ONU 100 first attempts a reset of the other device 110 in which the error occurred. If the device 110 still is not restored, the device 110 attempts a power source reset. Then, if the device 110 still is not restored, the device 110 stops the operation of the communication apparatus.

[Operations of Device]

Figure 9:
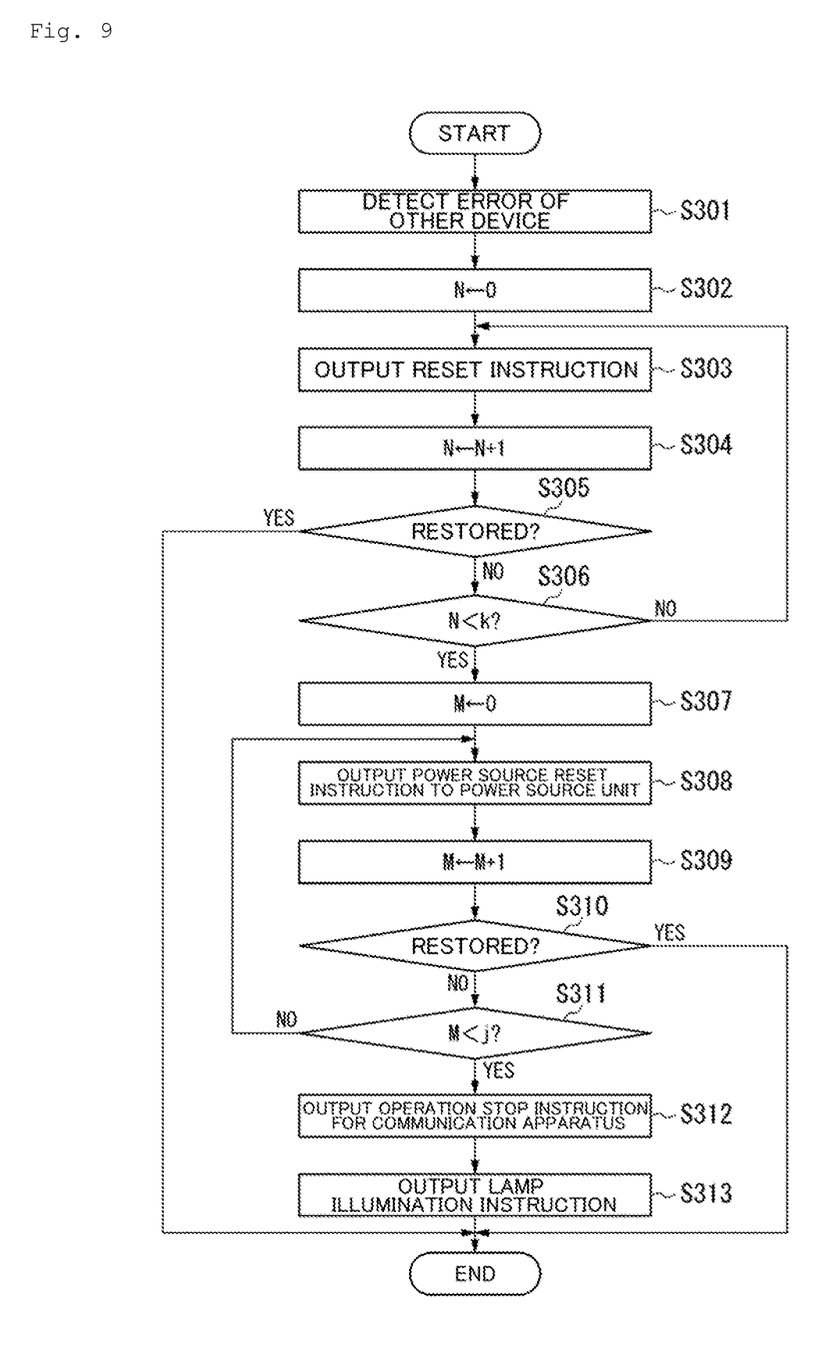
FIG. 9 is a flowchart showing operations of a device 110 according to a modified example of the second embodiment of the present invention.

FIG. 9 is a flowchart showing the operation of the device 110 according to the modified example of the second embodiment of the present invention. The flowchart shown in FIG. 9 starts when an error occurs in the other device 110. Note that in the following description, the operations of the device 110a will be described as an example, but the operations of the device 110b are also the same.

The control unit/apparatus monitoring unit 112a of the device 110a detects an error that occurs in the other device 110 (device 110b) (step S301). As described above, the error referred to here is an error that causes, for example, runaway or stopping of operation of the device 110. Next, the control unit/apparatus monitoring unit 112a initializes a variable N, which indicates a counter for counting the number of instances of outputting a reset instruction, by substituting 0 for the value of the variable N (step S302). Note that the leftward arrows shown in step S302, step S304, step S307, and step S309 in the flowchart of FIG. 9 mean operations of substituting the value on the right side for the variable on the left side. The value of the variable N is temporarily stored in, for example, a storage medium (not shown) included in the control unit/apparatus monitoring unit 112a.

Next, the control unit/apparatus monitoring unit 112a outputs a reset instruction to the device 110b via the control signal line (step S303). Next, the control unit/apparatus monitoring unit 112a adds 1 to the value of the variable N (step S304).

Next, if the control unit/apparatus monitoring unit 112a detects that the device 110b has been restored due to the reset (step S305, Yes), the operations of the device 110a shown in the flowchart of FIG. 9 end. On the other hand, if the control unit/apparatus monitoring unit 112a detects that the device 110b has not been restored (step S305, No), the control unit/apparatus monitoring unit 112a determines whether or not the value of the variable N is less than the predetermined value k (step S306). Note that the predetermined value k is a value indicating the maximum number of instances of attempting the reset processing of the device 110. The predetermined value k is, for example, a value determined in advance by a person in charge of operation and maintenance, or the like.

If the value of the variable N is less than the predetermined value k (step S306, No), the control unit/apparatus monitoring unit 112a repeats the above-described operations of step S303 and onward. On the other hand, if the value of the variable N has reached the predetermined value k (step S306, Yes), the control unit/apparatus monitoring unit 112a performs the operations of step S307 and onward. Note that since the operations of step S307 and onward shown in FIG. 9 are the same as the operations of step S202 and onward shown in FIG. 8, description thereof will be omitted.

Note that it is also possible to use a configuration in which the values of the variable N and the predetermined value k used in step S306 above are used as the values of the variable M and the predetermined value j in step S311. That is, a common variable and a common predetermined value may be used for the maximum number of instances of attempting reset processing for the device 110 and the maximum number of instances of attempting power source reset processing performed by the power source unit 140 for the entire ONU 100.

As described above, the device 110 of the ONU 100 (communication apparatus) according to the modified example of the second embodiment monitors the communication apparatus. Then, the device 110 resets the operating state of the other device 110 if an error that causes runaway or stopping of operation occurs in the other device 110. If the other device 110 still is not restored, the device 110 repeatedly resets the operating state of the other device 110. If the other device 110 still is not restored even if reset is attempted until the predetermined number of instances is reached, the device 110 executes a power source reset for resetting the power source of the entire communication apparatus. If the communication apparatus still is not restored, the device 110 repeatedly performs the power source reset. If the communication apparatus still is not restored even if the power source reset is attempted until a predetermined number of instances is reached, the device 110 stops the operation of the communication apparatus. Then, the device 110 illuminates the lamp in order to cause the user, the person in charge of operation and maintenance, or the like to recognize that the communication apparatus is in the operation-stopped state. The ONU 100 waits until the user, the person in charge of operation and maintenance, or the like manually restores the communication apparatus.

By including the above configuration, the ONU 100 according to the modified example of the second embodiment can autonomously attempt restoration of itself if an error occurs in the communication apparatus. If the ONU 100 detects an error from which restoration is possible through, for example, a power source reset (or reconfiguration), the ONU 100 can autonomously reset and restore itself.

Note that in each of the above-described embodiments, as an example, the ONU 100 is configured to detect an error that occurs in itself and perform restoration. However, the device to which the present invention can be applied is not limited to the ONU 100, and can be applied to other devices as well. The other device referred to here is, for example, a communication apparatus in a communication system other than OLT 300 and 10G-EPON, and a device other than a communication apparatus.

Some or all of the ONUS 100 in the above-described embodiment may also be realized by a computer. In that case, the program for realizing this function may also be recorded on a computer-readable recording medium, and the program recorded on the recording medium may be loaded to the computer system and executed. Note that it is assumed that the term "computer system" herein includes an OS and hardware of peripheral devices. Also, the "computer-readable recording medium" refers to a portable medium such as a flexible disk, a magneto-optical disk, a ROM, or a CD-ROM, or a recording device such as a hard disk built in a computer system. Furthermore, a "computer-readable recording medium" may also include a computer-readable recording medium that dynamically holds a program for a short amount of time, such as a communication line used in the case of transmitting a program via a network such as the Internet or a communication line such as a telephone line, and a computer-readable recording medium in which a program is held for a certain amount of time, such as a volatile memory inside a computer system that serves as a server or a client in such a case. Also, the above-described program may also be for realizing some of the above-mentioned functions, may further be capable of realizing the above-described functions in combination with a program already recorded in the computer system, and may also be realized using a programmable logic device such as an FPGA (Field Programmable Gate Array).

Although the embodiments of the present invention have been described above in detail with reference to the drawings, the specific configuration is not limited to these embodiments, and designs and the like within a range that does not deviate from the gist of the present invention are also encompassed therein.

REFERENCE SIGNS LIST

1 Communication system
100 ONU
110 (110*a*, 110*b*) Device
111 (111*a*, 111*b*) Main signal processing unit
112 (112*a*, 112*b*) Control unit/apparatus monitoring unit
120 Optical power receiving unit
130 UNI
140 Power source unit
200 User terminal
300 OLT
400 Optical splitter

The invention claimed is:

1. A communication device, comprising:

two or more components residing in a housing; and a power source residing in the housing;

wherein each component of the two or more components performs a communication operation and monitors at least one other component of the two or more components, upon detecting an error in the communication operation of a given component, each component of the two or more components sends a reset instruction to the given component, wherein each component of the two or more components further determines whether operation of the given component has been reset and sends a reset instruction to the power source in response to determining that the operation of the given component was not restored.

2. The communication apparatus according to claim 1, wherein the communication device is a terminal apparatus of an optical line.

3. An error detection method for a communication device having two components and a power supply residing therein, comprising:

monitoring, by each component of the two or more components, operation of at least one other component of the two or more components;

upon detecting an error in the operation of a given component, sending a reset instruction to the given component and determining whether operation of the given component has been reset; and sending a reset instruction to the power source in response to determining that the operation of the given component was not restored.

4. The error detection method of claim 3 further comprises, upon detecting an error in the operation of the given component, incrementing a first counter, comparing value of the first counter to a first threshold, and sending a reset instruction to the given component in response to the value of the first counter being less than the first threshold.

5. The error detection method of claim 4 further comprises stopping operation of the communication device in response to the value of the first counter being greater than the first threshold.

6. The error detection method of claim 4 further comprises illuminating a lamp of the communication device in response to the value of the first counter being greater than the first threshold.

7. The error detection method of claim 4 further comprises, in response to determining that the operation of the given component was not restored, incrementing a second counter, comparing value of the second counter to a second threshold, sending a reset instruction to the power source in response to the value of the second counter being less than the second threshold, and stopping operation of the communication device in response to the value of the second counter being greater than the second threshold.

8. The error detection method of claim 7 further comprises illuminating a lamp of the communication device in response to the value of the second counter being greater than the second threshold.

* * * * *